Aug. 20, 1946.  R. M. NARDONE  2,406,156
CONTROL DEVICE FOR HOISTING MECHANISM
Filed Sept. 17, 1942  2 Sheets-Sheet 2
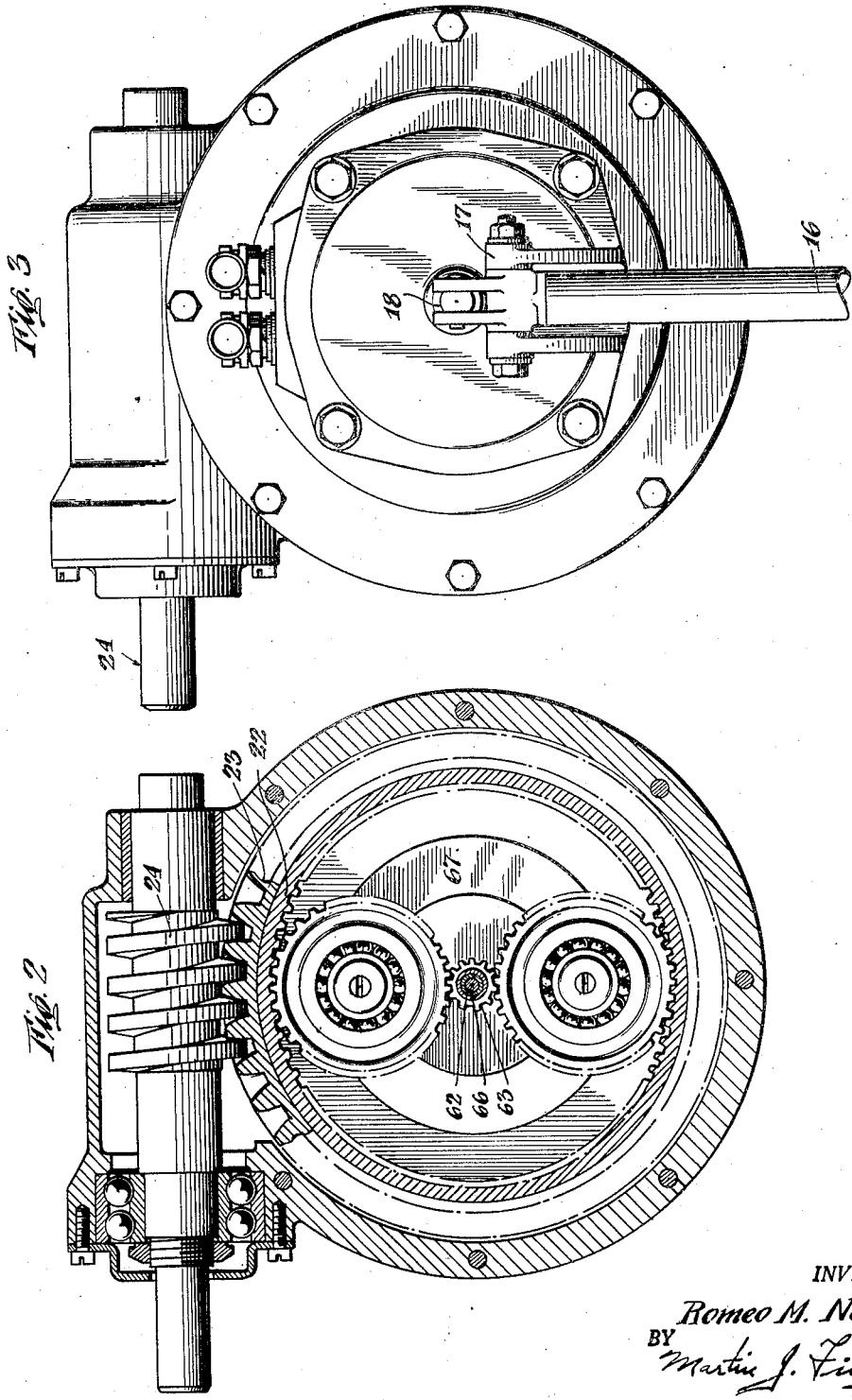
INVENTOR.
Romeo M. Nardone
BY
Martin J. Finnegan
ATTORNEY Patented Aug. 20, 1946

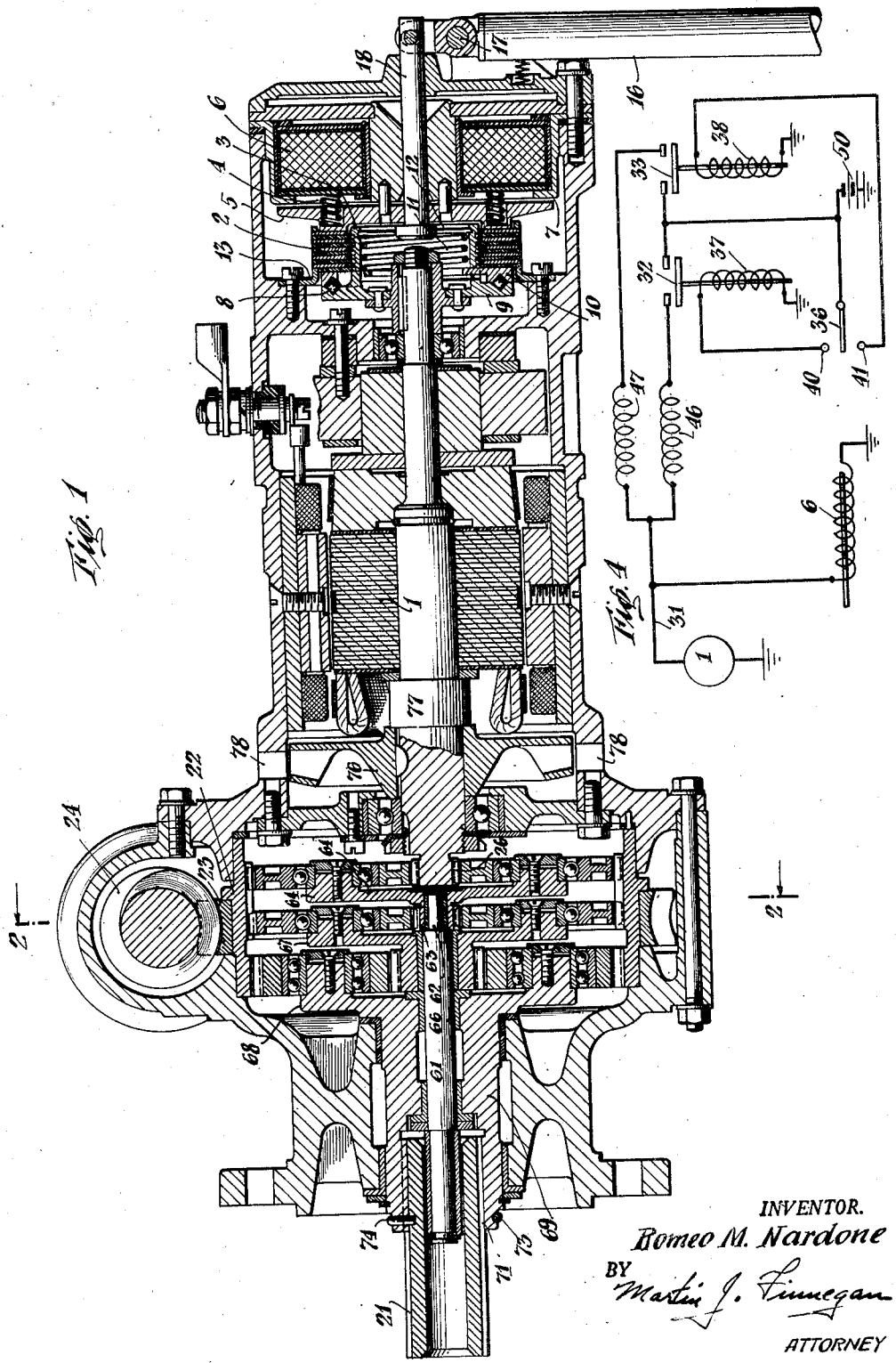

2,406,156

UNITED STATES PATENT OFFICE 2,406,156

CONTROL DEVICE FOR HOISTING MECHANISM

Romeo M. Nardone, Westwood, N. J., assignor to Bendix Aviation Corporation, South Bend, Ind., a corporation of Delaware Application September 17, 1942, Serial No. 458,744

7 Claims. (Cl. 188—180)

1

This invention relates to hoisting mechanism, and particularly to a hoisting mechanism applicable to the raising and lowering of heavy loads to be moved into an aircraft from the ground or out of an aircraft to the ground, or other point of lower level.

An object of the invention is to provide electrically operated and controlled hoisting mechanism of sufficiently small dimensions to permit of its use within the small space available on aircraft, while at the same time of sufficient load-lifting capacity to handle the relatively heavy equipment which it is sometimes necessary to carry in an aircraft of the cargo type.

Another object is to provide an electrically operated mechanism in which the prime mover is an electric motor controlled by novel mechanism normally operating as a brake upon the rotating elements of the motor, and effective to prevent rotation of the motor (and hence to prevent any movement of the load connected to the hoisting mechanism) except when current is flowing to the motor windings.

Another object is to provide in a mechanism of the character indicated, alternative manually operable means, and novel interconnecting gearing between the motor operated means and the manually operable means, functioning in such manner that one constitutes a reaction absorbing means for the other, depending upon which is being employed as the hoisting agent.

Another object is to provide novel electrical control means for both the motor and the braking mechanism above referred to.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

Fig. 1 is a longitudinal sectional view of a device embodying the invention;

Fig. 2 is a transverse sectional view along line 2—2 of Fig. 1;

Fig. 3 is an end view looking to the right of Fig. 1; and

Fig. 4 is a diagram of the electrical connections.

In the drawings, the reference character 1 designates an electric motor, which as shown is of the direct current type with series wound fields 46 and 47 (Fig. 4) wired for alternative energization, and with a rotating armature normally subject to the braking action of a friction disc assembly, designated by the reference character 2. The friction disc assembly is shown as located at the commutator end of the motor, and consisting of a series of friction discs splined alternately to a member 3 having driving connection with the armature of the motor on the one hand and a member 13 fastened to the housing on the other; the said discs being normally held in braking relationship one to the other by a set of angularly spaced coiled compression springs 4 which act upon a pressure plate 5 of magnetizable material. A solenoid coil 6 is located in close proximity to plate 5 such that when the solenoid is energized the plate is pulled away from the disc pack, overcoming the force of springs 4 and coming to rest against coil housing 7. This action occurs whenever the motor is energized, since the coil winding 6 is paralleled with the motor circuit 31, and is energized each time either of the two directional switches (32 and 33, Fig. 4) is closed. These switches are, in turn, controlled by master switch 36 and relays 37 and 38.

A centrifugal device is also included as part of the brake assembly. This consists of a series of steel balls 8 imbedded in tapered holes in member 9 secured to the armature shaft and in similar holes in backing plate 10 splined to 9 and rotating with it. At normal speeds, as when lifting a load when the brake 2 is free, the centrifugal force of these balls is more than counteracted by a spring 11 backed against an abutment 12 secured to brake member 3. However, when the motor is reversed and a load is being lowered, the torque on the motor shaft is materially reduced, since the load itself would produce armature rotation even if no current were passed through the motor fields (assuming the brake to be released). The speed of the armature at this stage is much higher, since the motor is of the series type. (The top or peak speed is preferably limited to three times normal lifting, or full load speed.) Since centrifugal force is proportional to the square of the speed, the force exerted by the balls axially against plate 10 is many times greater during the load lowering operation than at normal (load lifting) speed. Plate 10 is thereby moved axially against the discs 2, moving these also against magnet plate 5 and clamping the discs sufficiently to create a torque drag on the armature and thereby limit its peak speed. This same action occurs when the brake is manually freed by a pull on lever 16 hinged to the rear cover at point 17 and connected to rod 18 to move the rod longitudinally until its shouldered inner end contacts plate 5 and pulls it away from the disc pack. In lowering a load or weight, therefore, it is not essential that the motor be energized, since the operation may be accomplished by this manual release. However, should the motor be used, its current draw would be negligible at the low torque values. In fact (as above noted) the armature is dragged along rather than doing the driving.

Three sets of planetary gears in series, having a total reduction of 546 to 1, are shown as connecting the motor to the output shaft 21. The planetary internal or annulus gear 22 is normally held stationary by the friction of the worm gear 23 (secured to its outer surface) against the teeth of the mating worm 24. The reduction ratio (45 to 1) between the worm 24 and output shaft 21 is mostly between the worm and the gear, the planetaries adding very little to it. Rotation of the worm gear 23 rotates the annulus gear 22 and all the planets, the reaction member being the armature pinion 26, which is held stationary by the armature brake 2. The load on the output shaft 21 may therefore be raised or lowered by manual effort applied to the worm shaft 24.

When control switch 36 is thrown into contact with terminal 40, relay 37 is energized and switch 32 is closed, thus sending current (from source 50) to the motor 1 by way of series field winding 46; the said series field winding 46 having such a direction of wind, in relation to the armature, as to cause rotation of the motor in the load lifting direction. The lower the load the operator throws switch 36 against contact 41, whereupon field 47, rather than 46, is excited. This reverses the direction of rotation.

The three sets of planets of the planetary gearing are mounted on ball-bearing assemblies carried by individual carriers or cages, as indicated at 64, 67 and 68 in Fig. 1; the cage 67 being also shown in Fig. 2. The cage 64 has an extended hub upon which gear teeth are formed to constitute the sun gear (63) of the middle planetary set; the stub shaft 61 being of reduced diameter at its inner end to receive said cage 64 and also the bearing sleeve or bushing 66 which facilitates rotation of the cage 64 and sun gear 63 about the shaft 61. The planet cage 68 also has an elongated hub 69, which is rotatable about the stub shaft 61, and at its outer portion is internally splined to receive the correspondingly splined load-engaging member 21; the parts 69 and 21 being further secured against relative movement by the insertion of a locking ring 75 having an inwardly turned end portion as indicated at 74. A fan 76 is also shown as keyed to the armature shaft 77 and is adapted to circulate cooling air and remove excessive heat by way of the apertures 78 in the motor housing.

What is claimed is:

1. In mechanism for raising and lowering a load: a motor having a rotatable armature operable for raising or lowering the load; brake means operatively associated with said armature to normally preclude rotation of the latter, when the motor is deenergized; electrically operated means disposed in circuit with said motor and effective, upon energization of said motor, to render said brake means ineffective thus affording rotation of said armature; and speed actuated means responsive to the rotational speeds of said motor armature and operatively associated with said brake means for progressively applying a pressure to the latter to thereby limit the rotational speed of said motor armature.

2. The structure of claim 1 as set forth and defined therein; including means independent of said electrically operated means and operatively associated with said brake means to render the latter ineffective to braking regardless of the deenergized motor.

3. In a mechanism for raising and lowering a load: a motor having a rotatable armature operable for raising or lowering the load; a plurality of alternately arranged fixed and rotatable brake discs with the latter discs operatively connected to said armature and capable of coacting with the fixed discs to normally preclude rotation of said armature when said motor is deenergized, a pressure plate coactable with said discs for rendering the latter effective to braking; electro-magnetic means disposed in circuit with said motor and effective, upon energization of the motor, for rendering said pressure plate ineffective to braking; and speed actuated means responsive to the rotational speeds of said motor armature and operatively associated with said discs for progressively applying a pressure to the latter to thereby limit the rotational speed of said motor armature.

4. The structure of claim 3 as set forth and defined therein: including means independent of said electro-magnetic means and operatively associated with said pressure plate for rendering the latter ineffective to braking regardless of the deenergizing motor.

5. The structure of claim 3 as set forth and defined therein: including means extending through said electro-magnetic means and connected to said plate and operable independently of said electro-magnetic means and said speed actuated means for rendering said plate ineffective to braking regardless of the deenergized motor.

6. In a mechanism for raising and lowering a load: a motor provided with an armature shaft operable for raising or lowering the load; a sleeve connected to said shaft and rotatable therewith; a housing enclosing said motor; a series of brake discs fixed to said housing; an alternating series of brake discs connected to said sleeve and rotatable therewith; said discs being coactable to normally preclude rotation of said armature shaft when said motor is deenergized; a pressure plate coactable with said discs for rendering the latter effective to braking; electro-magnetic means disposed in circuit with said motor and effective, upon energization of the motor, for rendering said plate ineffective to braking; and centrifugal operated means connected to said shaft for rotation therewith and operatively associated with said discs for progressively applying a pressure to the latter to thereby limit the rotational speed of said armature shaft.

7. The structure of claim 6 as set forth and defined therein: including manually operable means operatively connected to said pressure plate for moving the latter to thereby render said pressure plate ineffective to braking regardless of the deenergized motor.

ROMEO M. NARDONE.